US010210177B2

(12) United States Patent
Lee

(10) Patent No.: US 10,210,177 B2
(45) Date of Patent: Feb. 19, 2019

(54) DISTRIBUTION MANAGEMENT SYSTEM

(71) Applicant: LSIS CO., LTD., Gyeonggi-do (KR)

(72) Inventor: Jae-Hyung Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 218 days.

(21) Appl. No.: 15/260,002

(22) Filed: Sep. 8, 2016

(65) Prior Publication Data

US 2017/0075923 A1   Mar. 16, 2017

(30) Foreign Application Priority Data

Sep. 11, 2015   (KR) .................. 10-2015-0129236

(51) Int. Cl.
G06F 17/00 (2006.01)
G06F 17/30 (2006.01)
G06Q 10/06 (2012.01)
G06Q 10/00 (2012.01)

(52) U.S. Cl.
CPC .... G06F 17/30241 (2013.01); G06F 17/3092 (2013.01); G06F 17/30938 (2013.01); G06Q 10/06 (2013.01); G06Q 10/20 (2013.01)

(58) Field of Classification Search
CPC ........... G06F 3/04842; G06F 17/30241; G06F 21/6218; G06F 3/0486; G06F 17/30424
See application file for complete search history.

(56) References Cited

U.S. PATENT DOCUMENTS

2004/0236620 A1* 11/2004 Chauhan ................ G06Q 10/06
705/7.14

2013/0025853 A1   1/2013 Morrow et al.
2013/0091258 A1   4/2013 Shaffer et al.

FOREIGN PATENT DOCUMENTS

| JP | 2004229456 A | 8/2004 |
| JP | 2010088277 A | 4/2010 |
| KR | 20130033806 A | 4/2013 |
| KR | 20130040081 A | 4/2013 |
| KR | 20130140237 A | 12/2013 |
| KR | 1020150034382 A | 4/2015 |
| WO | 2005081134 A1 | 9/2005 |
| WO | 2012055452 A1 | 5/2012 |

OTHER PUBLICATIONS

European search report dated Feb. 8, 2017 for EP application No. 16183002.1.

* cited by examiner

Primary Examiner — Truong V Vo
(74) Attorney, Agent, or Firm — K&L Gates LLP

(57) ABSTRACT

Embodiments of a distribution management system are disclosed. In some embodiments, a distribution management system enables to effectively provide geographic information system (GIS) data regarding an electric power application model applied to a supervisory control and data acquisition (SCADA) system using an international electrotechnical commission (IEC)-61968 standard, is a distribution management system based on IEC-61968, includes a GIS tool for generating GIS schema data, a GIS transfer unit for receiving the GIS schema data to transform the received GIS schema data into a format suitable for a standard, and one or more GIS distribution management applications connected to the GIS tool to receive the GIS schema data.

3 Claims, 4 Drawing Sheets

- Prior art -

"DISTRIBUTION MANAGEMENT SYSTEM"

DISTRIBUTION MANAGEMENT SYSTEM

CROSS REFERENCE TO RELATED APPLICATIONS

This application claims the benefit of Korean Patent Application No. 10-2015-0129236, filed on Sep. 11, 2015, entitled "DISTRIBUTION MANAGEMENT SYSTEM", which is hereby incorporated by reference in its entirety.

BACKGROUND

Technical Field

The present disclosure relates to a distribution management system. More particularly, embodiments of the present disclosure relate to a distribution management system capable of effectively providing geographic information system (GIS) data regarding an electric power application model applied to a supervisory control and data acquisition (SCADA) system using an international electrotechnical commission (IEC)-61968.

Description of the Related Art

In general, a supervisory control and data acquisition (SCADA) system is a computer system for monitoring and controlling an operation process on the basis of an industry control system, that is, an industry process/infrastructure/facility, and is widely used in various fields.

A large-scale SCADA system may be applicable to a distribution system, and may provide suitable data to a user through a variety of applications.

In this regard, IEC proposes various standards related to electricity, and IEC-61968 specifies information interchanges between distribution systems, a communications protocol regarding management, a protocol and the like.

A vender or enterprise produces and manufactures products in various manners on the basis of such communications protocol.

A distribution management system using a typical SCADA system is configured to acquire and process all data in a SCADA database (DB) before the data arrives at an application.

With reference to FIG. 1, there is shown a typical system in which a device DB, a GIS DB, and a network DB are respectively connected to a SCADA DB, and the SCADA DB integrally accommodates device data, GIS data, and network data and converts the data into a format applicable to an application to apply them to various applications.

In such a typical system, various applications generate information based on the SCADA DB to suitably use the information for the applications.

In such a case, since an error occurs between GIS data provided from a device point and GIS data to which actualities are reflected, there is an inconvenience in which a continuous updating is needed.

Also, in the typical system, GIS data having no meaning of a real time data processing is simultaneously processed together with DB data which should be processed in a device, such that an amount of data handled in the SCADA DB is dramatically increased to cause a degradation of a processing speed of an entire system.

In other words, since an amount of data stored in the GIS DB has huge volume and the GIS data is processed together with an operation of an application not requiring GIS data when the SCADA DB is connected to the GIS DB, a processing speed of a system may be decreased.

SUMMARY

A technical problem to be solved by some embodiments of the present disclosure is to provide a distribution management system capable of being converted into a periodic or non-periodic updating of geographic information system (GIS) data instead of a real time updating thereof.

Therefore, some embodiments of the present disclosure are capable of reducing a database (DB) burden due to a real time data processing, promptly updating GIS data, and maintaining a newest map.

Also, in accordance with some embodiments, an inconvenience caused by a design of a system by considering GIS in a schema stage may be resolved and a flexible DB design may be possible.

In addition, in accordance with some embodiments, an inconvenience in which a supervisory control and data acquisition (SCADA) DB should acquire and process all data may be resolved to improve a processing speed of a system.

To address the technical problems described above, a distribution management system according to some embodiments, which enables to effectively provide GIS data regarding an electric power application model applied to a SCADA system using an international electrotechnical commission (IEC)-61968 standard, includes a GIS tool configured to generate GIS schema data, a GIS transfer unit configured to receive the GIS schema data to transform the received GIS schema data into a predetermined format, and one or more GIS distribution management applications configured to receive the GIS schema data from the GIS tool.

In some embodiments, it is preferable that the distribution management system may further include a GIS DB connected to the GIS transfer unit to receive and store the GIS schema data from the GIS transfer unit.

In some embodiments, it is preferable that the GIS distribution management application may be updated by receiving the GIS schema data from the GIS tool.

In some embodiments, it is preferable that the GIS transfer unit may transform the GIS schema data based on an electricity related standard including IEC-61968.

In some embodiments, it is preferable that the GIS schema data may be an extensible markup language (XML) format or an IEC common model.

In some embodiments, it is preferable that the GIS distribution management application may be a distribution automation system (DAS) or an energy management system (EMS).

In some embodiments, it is preferable that the GIS transfer unit may be configured to operate when the GIS DB 120 is updated.

In some embodiments, it is preferable that the GIS DB may store the GIS schema data and data information regarding after the GIS schema data has been transformed.

Also, a distribution system according to some embodiments of the present disclosure includes the distribution management system, and a SCADA database connected to the distribution management system and configured to store data so as to control a distribution management application.

In some embodiments, it is preferable that the distribution management system may include the distribution management application, which is provided in one or more numbers, connected to the SCADA database.

In some embodiments, it is preferable that the SCADA database may be configured to receive the GIS data provided from the distribution management system through the GIS transfer unit.

In some embodiments, it is preferable that the distribution system may further include a network database and a device database which are connected to the SCADA database.

In accordance with some embodiments, a DB burden due to a real time data processing may be reduced, a prompt updating of GIS data may be possible, and a newest map may be easily maintained.

Also, in accordance with some embodiments, an inconvenience caused by a design of a system by considering GIS in a schema stage may be resolved and there may be advantageous to enable a flexible DB design.

In addition, in accordance with some embodiments, a real time SCADA DB to which actual GIS data is reflected may be built without burdening a real time DB, and a processing speed and reliability of a system may be improved.

DETAILED DESCRIPTION

Figure 1:
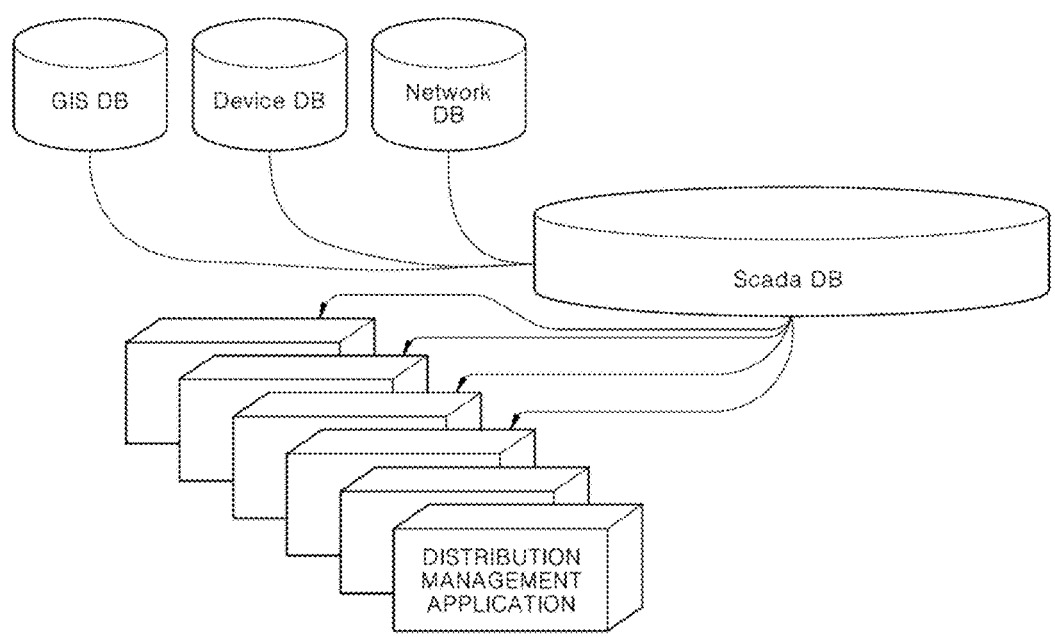
FIG. 1 is a block diagram of a distribution system using a SCADA system according to the prior art.

The present disclosure may be possible to include various changes and numerous other embodiments, and certain embodiments will be illustrated in the drawings and description thereof will be described in detail.

However, embodiments disclosed herein should be construed as a number of illustrative embodiments and not to be limited thereto, and the scope of the present disclosure should be construed by the appended claims, along with the full ranges of changes, equivalents, and substituents to which such claims are entitled.

Hereinafter, one embodiment according to the present disclosure will be described in detail with reference to the accompanying drawings. Throughout the accompanying drawings, the same reference numerals refer to like components.

Figure 2:
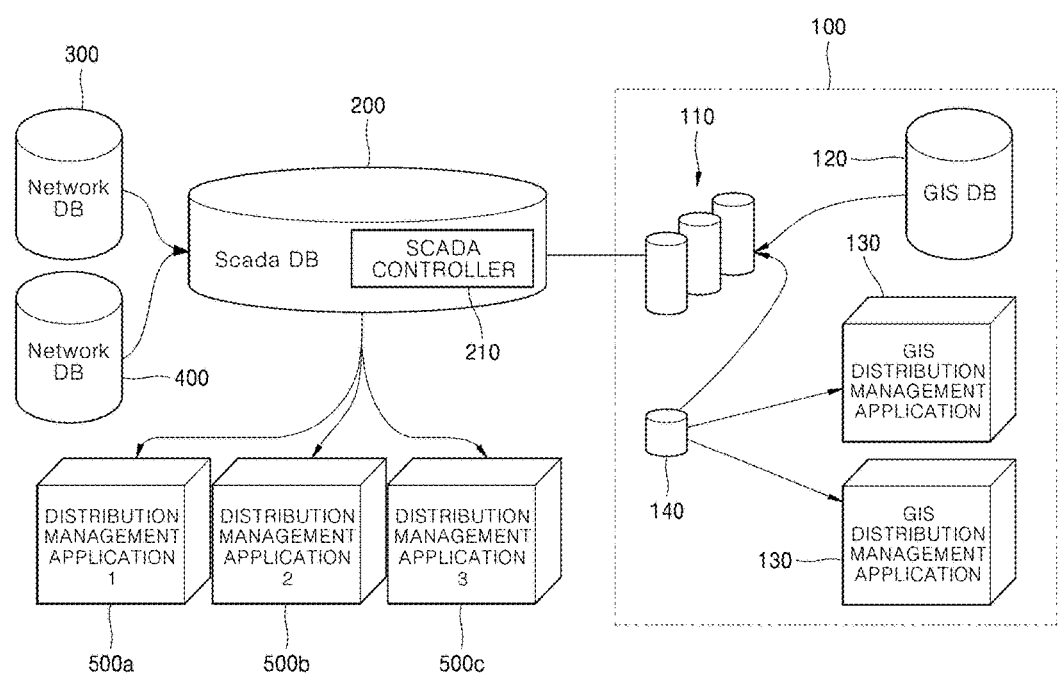
FIG. 2 is a block diagram of a distribution management system according to some embodiments.

With reference to FIG. 2, a configuration of a distribution management system 100 based on an IEC 61968 schema according to some embodiments is illustrated. Firstly, by describing IEC 61968, this is an international standard for information interchanges between distribution management systems, and specifies an information model related to a distribution management system, a communications protocol related to an information interchange/management, and a protocol.

Specifically, IEC 61968-4 recommends the use of a geography markup language (GML) based on an extensible markup language (XML) in connection with an interchange of geographical information regarding a utility resource.

In other words, GML is an XML grammar for expressing geographical features and an open interchange format for transmitting and receiving geographical data on Internet, and also is used as a modeling language for a geographical data system.

An GML document is described using a GML schema, and is classified into a description part of a document and a real data part the same as most of XMLs based on a grammar.

Here, an XML file is a next generation Internet language which is proposed for an efficient information sharing on Internet.

In an IEC 61968 communication protocol, data described in an XML format suitable for a schema of each standard is interchanged so as to support a data interchange and compatibility between different electric power devices.

In particularly, some embodiments relate to a method for connecting a GIS model to a typical SCADA system among contents included in IEC 61968-4 (Asset Management Model), and also to an application of GML based on XML defined by an open GIS consortium (OGC).

With reference to FIG. 2, the distribution management system 100 according to some embodiments includes a GIS transfer unit 110, a GIS distribution management application 130, and a GIS tool 140.

Also, the distribution management system 100 may further include a GIS DB 120.

The GIS tool 140 may generate GIS schema data, and transmit the generated GIS schema data to the GIS distribution management application 130 or to the GIS transfer unit 110.

When transmitting the GIS schema data to a plurality of GIS distribution management applications 130, the GIS tool 140 may distribute the GIS schema data in a format applicable to each application.

The GIS transfer unit 110 transforms data received from the GIS tool 140 into a predetermined format.

For example, the GIS transfer unit 110 may transform the GIS schema data in a format suitable for a certain electricity related standard.

The electricity related standard may include IEC-61968, for example.

Such a GIS transfer unit 110 may further include an extensible stylesheet language (XSL) unit (not shown). XSL is a standard for transforming an XML document described according to one schema form into an XML document described according to another schema form.

The XSL unit may store an XSL document which defines data mapping histories of a communication protocol in a table using schema data according to each standard.

For example, the GIS transfer unit 110 may transform data into a format suitable for a predetermined standard based on such an XSL document.

Also, the distribution management system according to some embodiments may be connected to a SCADA DB 200 through the GIS transfer unit 100 to receive data from the SCADA DB 200 or to transmit data thereto.

It should be noted that GIS schema data may be included in data transmitted between the SCADA DB 200 and the GIS transfer unit 110.

The GIS DB 120 may be connected to the GIS transfer unit 110 to receive and store data including the GIS schema data therethrough.

The GIS distribution management application 130 may be provided in one or more numbers, and may be an application such as a distribution automation system (DAS), an energy management system (EMS), or the like. This will be described later in detail.

The GIS distribution management application 130 may receive GIS schema data from the GIS tool 140 to update GIS data of each application.

In other words, the GIS distribution management application 130 may periodically or non-periodically perform an updating on GIS data by receiving necessary data from the GIS DB 120 without updating the GIS data in real time.

Meanwhile, although not shown in the drawings, the GIS distribution management application 130 may be directly connected to the GIS DB 120 to receive the GIS schema data therefrom.

As described above, the distribution management system 100 according to some embodiments may be connected to the SCADA DB 200 through the GIS transfer unit 110 to configure a distribution system.

And, one or more distribution management applications 500 may be additionally connected to the SCADA DB 200.

In addition, a network DB 300 and a device DB 400 are respectively connected to the SCADA DB 200. The SCADA DB 200 may receive the GIS data from the GIS transfer unit 110 to build a real time SCADA DB to which actual GIS data is reflected.

Figure 3:
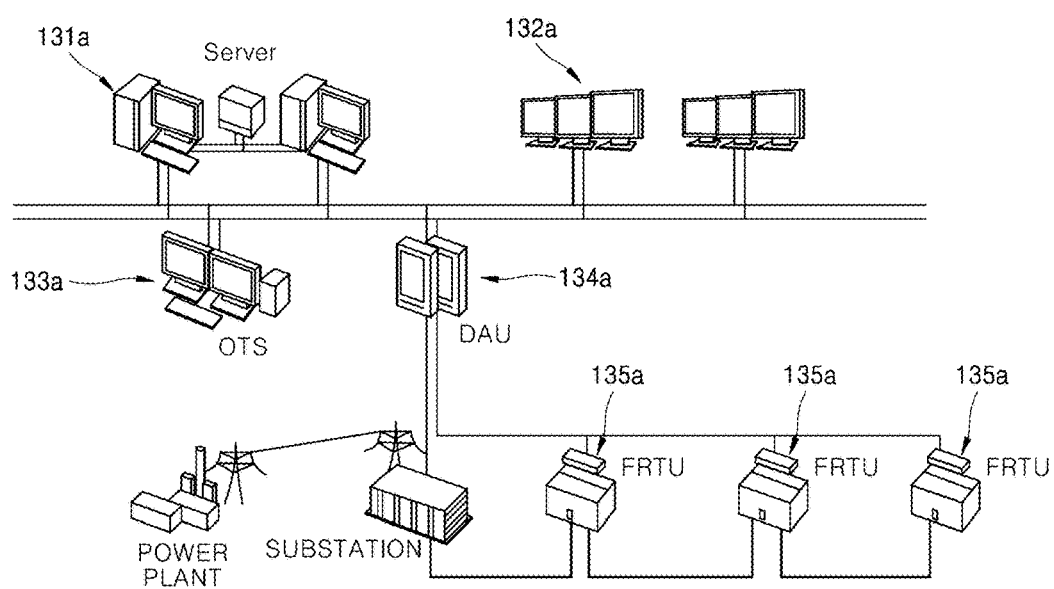
FIG. 3 is a diagram illustrating some embodiments of a distribution management application configuring a distribution management system according to some embodiments.

FIG. 3 is a diagram illustrating some embodiments of an electric power application 130 configuring the distribution system based on an IEC 61968 schema.

In FIG. 3, it will be described that an electric power application is a distribution automation system (DAS) 130a.

The DAS 130a is a system for remotely monitoring and controlling an operation status of a gas switchgear and an operating manipulation of a facility, which are applied to a distribution line, using a computer and a communication technology, and performs an automatic discrimination and a rapid restoration when a malfunction occurs in the distribution system.

As shown in FIG. 3, the DAS 130a includes a server 131a, a man-machine interface (MMI) 132a, an operator training system (OTS) 133a, a data acquisition unit (DAU) 134a, a feeder remote terminal unit (FRTU) 135a, a wire/wireless communication device (a radio frequency (RF), a code division multiple access (CDMA), an optical communication and the like), a switchgear and the like.

The server 131a monitors an operation status of a distribution line through the FRTU 135a, and performs an automatic discrimination of a fault section, a fault section separation, and a restoration when a malfunction of the distribution line occurs.

The MMI (dispatcher) 132a supports a distribution line system display, a navigation screen, an alarm display and the like so as to enable an operator to monitor the operation status of the distribution line and to perform a remote control.

The OTS 133a presumes a postulated accident of the distribution line to perform a simulation regarding the postulated accident. The DAU 134a performs a communication with the FRTU 135a mounted at a gas switchgear and a remote terminal unit (RTU) equipment of a substation.

Also, the DAU 134a may collect various events generated at a field in real time to transmit the collected events to a higher level system, or may serve as a communication relay device by interpreting a control instruction of the higher level system to control the FRTU 135a.

The FRTU 135a receives an input of an underground/overhead gas switchgear and acquires information regarding an operation status of the switchgear and a fault current to transmit the information to the higher level system, and separates a fault section according to a control instruction of the higher level system.

Figure 4:
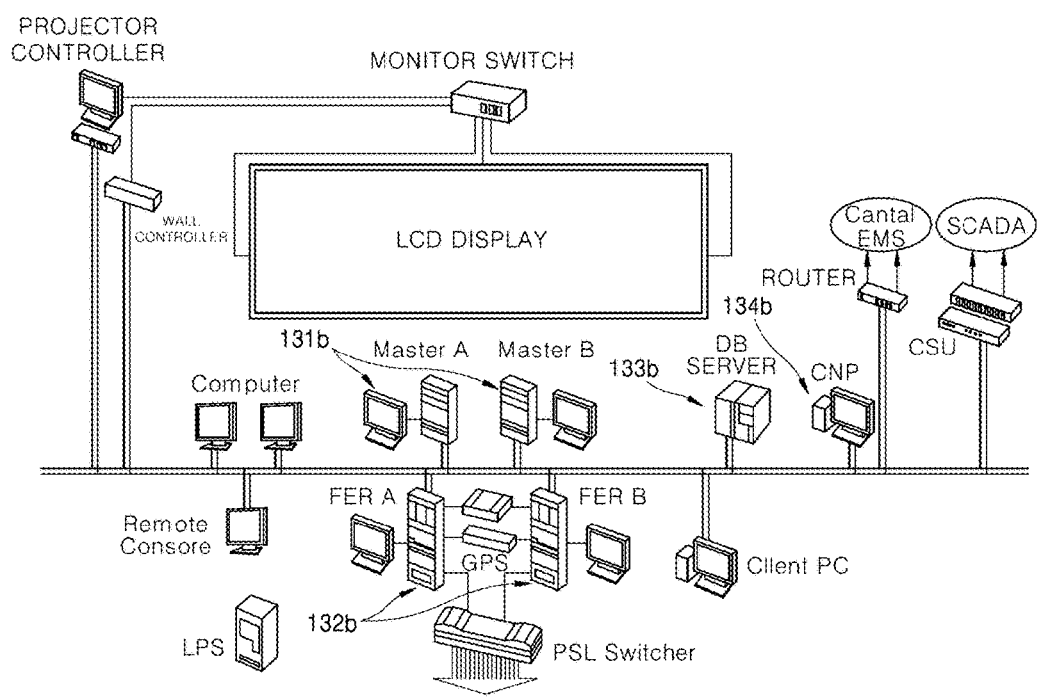
FIG. 4 is a diagram illustrating some embodiments of a distribution management application configuring a distribution management system according to some embodiments.

FIG. 4 is a diagram illustrating some embodiments of an electric power application configuring the distribution system based on an IEC 61968 schema.

In FIG. 4, it will be described that an electric application is the EMS 130b.

The EMS 130b is an electric power control system for performing an economic dispatch by efficiently managing an electric power system and optimally controlling an operation of a generating facility linked to a system through a permanent information collection and a load frequency monitoring with respect to an entire electric power supply system.

Further, as shown in FIG. 4, the EMS 130b includes a master 131b, a front end processor (FEP) 132b, a DB server 133b, a communications network processor (CNP) 134b and the like.

The master 131b performs works such as an entire system node management, an application program execution, a DB management and the like, an alarm/event processing, an automatic operation control and the like.

The FEP 132b acquires operation information of a power plant and a substation from the RTU equipment to transmit the operation information in real time to each node such as the master 131b, a data processing device and the like.

The DB server 133b periodically receives the collected data from the master 131b to process and store the received data.

The CNP 134b is a device enabling a data connection to the EMS and a local dispatching facility through a data link, and may be configured in a point-to-point manner.

In accordance with some embodiments described herein, it may be possible to implement a distribution system capable of reducing a DB burden due to a real time processing, enabling a prompt updating of GIS data, and building a SCADA DB to which actual GIS data is reflected.

Also, there is no inconvenience to design a system by considering GIS in a schema stage so that it may be advantageous to enable a flexible DB design.

In addition, a real time SCADA DB to which actual GIS data is reflected may be built without burdening a real time DB, and a processing speed of a system and reliability thereof may be improved.

Although configurations and features have been described in conjunction with some embodiments, the present disclosure is not limited thereto, and it should be understood that numerous other modifications and changes can be devised by those skilled in the art that will fall within the spirit and scope of the principles of this disclosure. Therefore, the scope of the present disclosure should be construed by the appended claims, along with the full range of modifications and changes and to which such claims are entitled. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claim.

What is claimed is:

1. A distribution management system for effectively providing geographic information system (GIS) data regarding an electric power application model applied to a supervisory control and data acquisition (SCADA) system using an international electro-technical commission (IEC)-61968 standard, the distribution system comprising:

a GIS tool configured to generate GIS schema data;

a GIS transfer unit configured to receive the GIS schema data to transform the received GIS schema data into a predetermined format;

one or more GIS distribution management applications configured to receive the GIS schema data from the GIS too, and wherein the GIS transfer unit is further configured to transform the GIS schema data based on an electricity related standard including the IEC-61968 standard, wherein the GIS schema data comprises an extensible markup language (XML) format or an IEC common model, wherein the one or more GIS distribution management applications comprise a distribution automation system (DAS) or an energy management system (EMS), wherein the distribution management system is connected to a SCADA database configured to store data so as to control a distribution management application, a network database, and a device database, each of which are connected to the SCADA database.

2. The distribution management system of claim 1, further comprising:

a GIS database (DB) configured to be connected to the GIS transfer unit and to receive and to store the GIS schema data from the GIS transfer unit, wherein the GIS transfer unit is configured to operate when the GIS DB is updated, and the GIS DB stores the GIS schema data and data information regarding after the GIS schema data includes been transformed.

3. The distribution management system of claim 1, wherein the GIS distribution management application is updated by receiving the GIS schema data from the GIS tool.

* * * * *